March 31, 1964  F. STAHLECKER  3,127,223
SPINDLE BEARING

Filed Sept. 28, 1961  4 Sheets-Sheet 1

INVENTOR.
FRITZ STAHLECKER
BY Dicke and Craig
ATTORNEYS

March 31, 1964  F. STAHLECKER  3,127,223
SPINDLE BEARING

Filed Sept. 28, 1961  4 Sheets-Sheet 3

INVENTOR.
FRITZ STAHLECKER
BY Dicke and Craig
ATTORNEYS

March 31, 1964          F. STAHLECKER          3,127,223
                        SPINDLE BEARING
Filed Sept. 28, 1961                     4 Sheets-Sheet 4

INVENTOR.
FRITZ STAHLECKER
BY Dicke and Craig
ATTORNEYS

United States Patent Office 3,127,223
Patented Mar. 31, 1964

3,127,223
SPINDLE BEARING
Fritz Stahlecker, Botzensteige, Bad Uberkingen, Wurttemberg, Germany
Filed Sept. 28, 1961, Ser. No. 141,416
Claims priority, application Germany Oct. 10, 1960
18 Claims. (Cl. 308—152)

The present invention relates to a bearing structure for vertical spindles and more particularly for mounting a spindle of a spinning or twisting machine which is driven by a band, cord, or the like and is rotatable in separate neck and foot step bearings which are mounted in a common housing.

If a spindle is mounted in separate neck and foot bearings, it is necessary to employ the foot bearing to take up and compensate the oscillations of the spindle which are caused by unbalancing forces acting upon the spindle. The spindle should then immediately return to its normal position and thus be centered automatically. For attaining this object, various means have already been proposed which tend to eliminate these forces by the employment of friction. Thus, for example, there are mechanical damping means known for this purpose, the friction surfaces of which are made primarily of a conical shape so as also to serve as centering means. Additional centering means are, however, required if the oscillations of the spindle are to be damped by employing the molecular friction of oil. Thus, for example, in one well-known spindle bearing this purpose is accomplished by the use of a spring tube. When employing a spring the natural oscillations of which are not damped considerably, there is always the danger that the oscillations of the spindle will be amplified by the resiliency of the spring to such an extent that they can no longer be taken up by any additional damping means. If, on the other hand, as it is done in other known devices, the spindle is to be centered by conical or hemispherical supporting means, it often occurs, especially at minor deflections of the spindle, that the friction occurring in such means will prevent a proper centering.

It is an object of the present invention to provide a foot bearing for a spindle which is capable of taking up and compensating not only minor unbalances, but also very considerable unbalances of the spindle. According to the invention, this object is attained essentially by providing the damping and centering socket, which surrounds the foot bearing with a small intermediate clearance, with centering means in the form of tilting edges at the upper and lower ends of the socket, and to mount this damping and centering socket in a manner which is known as such in further damping means, for example, in an oil damping coil.

The damping socket may then be pressed solely by the gravity of the spindle and bobbin or additionally by a spring upon an abutment containing or carrying the lower tilting edge. Depending upon the sensitivity required, the lower tilting edge about which the damping socket is tiltable may be disposed either close to or farther away from the central axis of the bearing housing. The abutment which has a level surface for receiving the tilting edge of the damping socket may be made in the form of a cup-shaped insert which rests on a flat or conical shoulder in the bore of the housing.

The clearance between the upper tilting edge of the damping socket and the wall of the bearing housing or an additional tubular insert therein may be compensated by a ring which forms the tilting edge and may be made of different shapes. The optimum ratio between the height of the damping socket and the diameter of the bore in the housing lies within the range of 2 to 1 to 4 to 1.

The above-mentioned as well as additional objects, features, and advantages of the present invention will become more clearly apparent from the following detailed description thereof which is to be read with reference to the accompanying drawings, in which:

FIGURE 4b shows a sectional view of a further modification of the embodiment according to FIGURE 4; while

Figure 1:
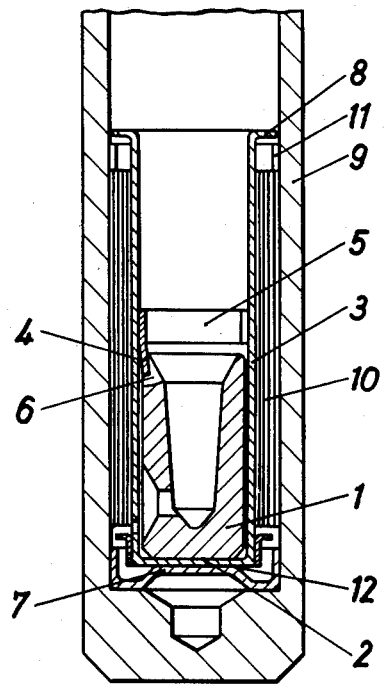
FIGURE 1 shows a longitudinal section of the lower part of the bearing housing and of the foot bearing according to the invention therein.

In the first embodiment of the invention as illustrated in FIGURE 1 the foot bearing 1 for a spindle is inserted with a small radial clearance into the damping socket 3 so that its level base 2 engages with the bottom of the socket. Bearing 1 is locked against rotation by a projection 4 on a spring ring 5 which engages into a recess 6 in bearing 1. Socket 3 rests upon a flat central surface of a cup-shaped abutment 7 and it is provided at its upper end with a flange 8 of a diameter which substantially corresponds to the inner diameter of housing 9 in which the neck and foot bearings of the spindle are mounted. An additional damping element in the form of an oil damping coil 10 surrounds the damping socket 3 and it is secured in position within housing 9 by a locking ring 11.

If the spindle is unbalanced and tilted, the foot bearing must follow this tilting movement of the spindle and is thereby moved slightly out of its central position. If the oil damping which occurs between foot bearing 1 and damping socket 3 is not sufficient to take up the oscillations, socket 3 is moved in the same direction as the foot bearing. Since the flange 8 of socket 3 engages with the wall of the bore of housing 9 the socket must then tilt about the outer edge of flange 8 and thereby also about the edge 12 of the abutment 7. By this tilting movement, the bottom of the damping socket 3 is shifted slightly relative to the tilting edge 12 whereby a certain amount of friction is also produced. The oil in the damping coil 10 is then also partly displaced which results in an additional damping effect.

Figure 2:
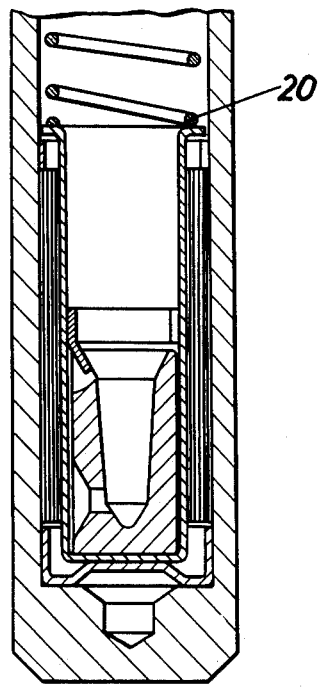
FIGURE 2 shows a view similar to FIGURE 1 of a modification of the foot bearing.

The embodiment of the invention as illustrated in FIGURE 2 corresponds substantially to that according to FIGURE 1, except that the damping socket is acted upon by a coil spring 20, whereby the entire damping device becomes less sensitive and is therefore capable of compensating greater unbalances of the spindle.

Figure 3:
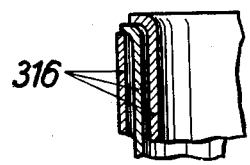
FIGURE 3 shows a similar view of a further modification of the invention.
Figure 3A:
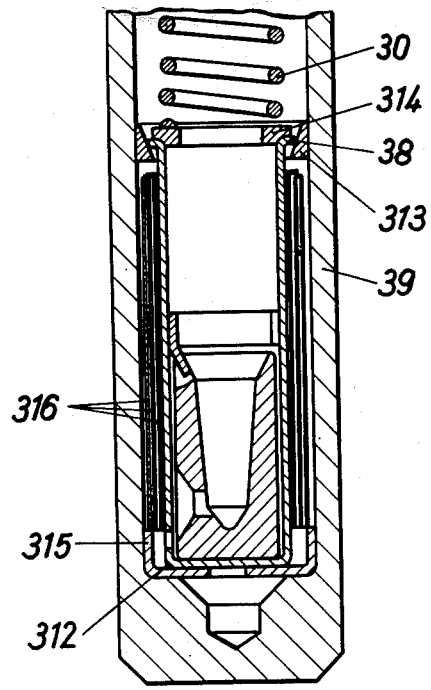
FIGURE 3a shows a similar view of a further modification of the invention.

The foot bearing as illustrated in FIGURES 3 and 3a differs from that according to FIGURE 2 primarily by the fact that the difference between the outer diameter of the flange 38 of the damping socket and the inner diameter of the bore of housing 39 is compensated by a conical spring ring 313 which is inserted into the housing together with the damping socket. Coil spring 30 then presses upon a ring 314 and through the latter upon the damping socket which rests on the flat surface of the cup-shaped insert 315 serving as an abutment. The tilting edge 312 of the damping socket is disposed as far outside as possible from the central axis of the housing. The additional damping means consist of tubes 316 which are telescoped into each other and the upper edges of which are flanged over, as shown in FIGURE 3a, so as to rest on each other. These flanges insure that the tubes remain in the intended position and that the gaps intermediate the tubes are closed at their upper ends so that the oil contained in these gaps cannot flow out in the upward direction and is therefore compelled to move within the gaps, which increases the damping effect.

Figure 4A:
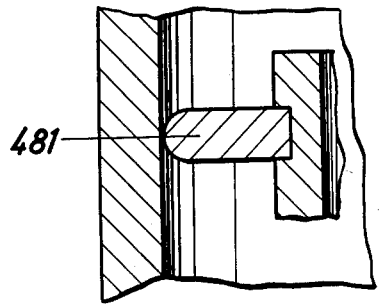
FIGURE 4a shows an enlarged sectional view of a modification of a detail of FIGURE 4.
Figure 4:
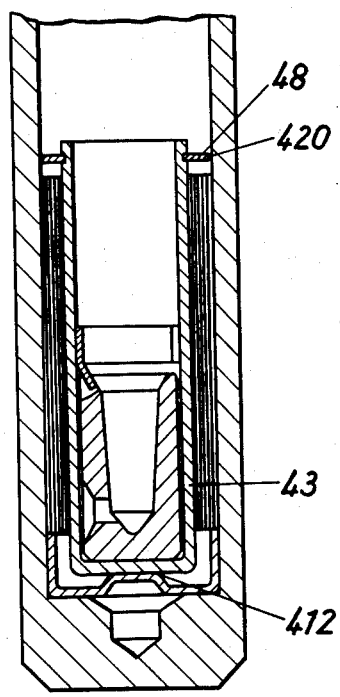
FIGURE 4 shows a view similar to FIGURE 1 of a further modification of the invention.

FIGURE 4 illustrates a bearing which already reacts to small oscillations of the spindle. This high sensitivity is attained by providing the lower tilting edge 412 for damping socket 43 at a point close to the central axis of the bearing housing. The upper tilting edge 420 of socket 43 is in this case not formed by a flange but by an inserted spring ring 48 which has a diameter in accordance with that of the bore in the bearing housing. In place of such an exchangeable spring ring, it is also possible to provide the upper tilting edge in the form of a ring 481 of an elastic synthetic material which engages with the wall of the bore of the housing and compensates for the difference in the diameters of the upper end of socket 43 and of the housing bore.

Figure 4B:
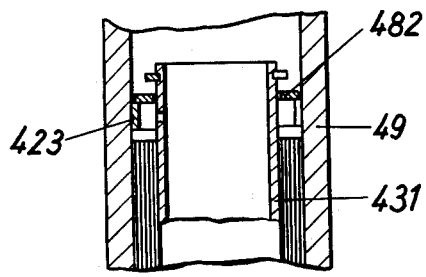

As illustrated in FIGURE 4b, the upper tilting edge of the damping socket may also be provided with an exchangeable, loosely inserted ring 482 which rests on a locking ring 423 which tightly engages with the wall of the bore in the housing. By the use of a ring 482 of a suitable size, it is possible to adjust the amount of clearance between ring 482 and socket 431 and also between this ring and the wall of the housing so that the desired tilting effect will be attained without requiring the ring, the damping socket, and the housing to be made of such accurate diameters that the bearing could be produced only at considerable expense.

Figure 5:
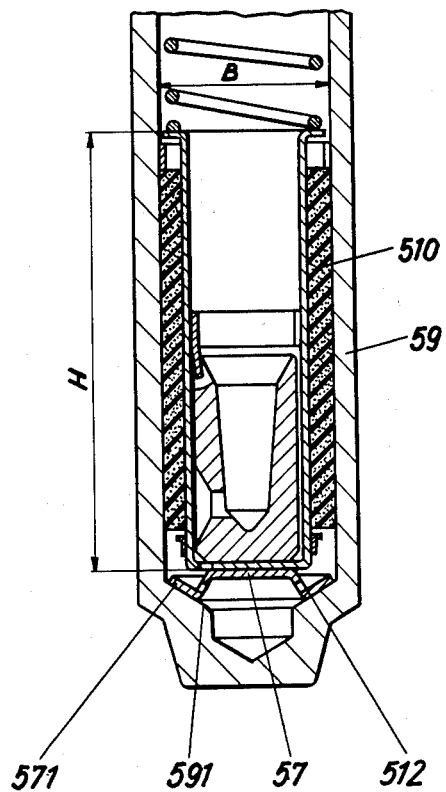
FIGURE 5 shows a view similar to FIGURE 1 of still another modification of the invention.

FIGURE 5 finally shows a foot bearing according to the invention in which a tubular member 510 of a synthetic material containing cavities for oil, for example, a foamy plastic, surrounds the damping socket within the bearing housing 59. The cup-shaped insert 57 has a flat central surface on which the tilting edge 512 rests and it is provided with a conical supporting surface 571 which rests on a corresponding conical shoulder 591 in housing 59. This conical supporting surface 571 insures that the flat surface of insert 57 on which the tilting edge 512 engages will remain level at all times. In the embodiments according to FIGURES 1 to 4, however, the inserts forming the abutments rest on level shoulders in the housings. The production of such a level shoulder is, however, in some cases, for example, when the housing consists of steel, more difficult and expensive than the production of a conical shoulder.

The damping sockets according to all of the embodiments of the invention may be made of a height which is in a certain relation to the dimensions of the foot bearings and damping means so that the damping and centering properties of the bearing structure will be improved as much as possible. Thus it has been found that the best possible ratio between the height H of the damping socket and the diameter B of the bore in housing 59, as indicated in FIGURE 5, will lie within the range of 2 to 1 to 4 to 1. If these dimensional ratios are adhered to, the manufacture of the damping sockets and the additional damping means will be very inexpensive and they will also permit the lower foot bearing together with the damping socket and the additional damping means to be assembled into a structural unit and to be installed as a unit.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket tilt relative to said housing comprising upper and lower tilting edges serving as centering means at the upper and bottom ends, respectively, of said socket, and further damping means within said housing and surrounding said socket.

2. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket tilt relative to said housing comprising upper and lower tilting edges serving as centering means at the upper and bottom ends, respectively, of said socket, and an insert rigidly mounted in said housing and having a raised level upper surface portion engaging with an supporting the bottom end of said socket to permit said socket to tilt thereon about said lower tilting edge, and further damping means within said housing and surrounding said socket.

3. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, said housing having a conical shoulder therein, and an insert having a corresponding conical lower surface portion rigidly resting on said shoulder and a level upper surface portion engaging with and supporting the bottom end of said socket to permit said socket to tilt thereon about said lower tilting edge, and further damping means within said housing and surrounding said socket.

4. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and an insert rigidly mounted in said housing and having a raised level upper surface portion engaging with and supporting the bottom end of said socket to permit said socket to tilt thereon about said lower tilting edge, said lower tilting edge being located close to the central axis of said housing, and further damping means within said housing and surrounding said socket.

5. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and an insert rigidly mounted in said housing and having a level upper surface engaging with and supporting the bottom end of said socket to permit said socket to tilt thereon about said lower tilting edge, said lower tilting edge being located at the outer edge of the bottom of said socket, and further damping means within said housing and surrounding said socket.

6. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, said upper tilting edge comprising a flange bent over outwardly from the upper end of said socket toward the wall of said housing, and further damping means within said housing and surrounding said socket.

7. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and a ring having an inner conical surface slidingly mounted within said housing, said upper tilting edge comprising a flange bent over outwardly from the upper end of said socket and engaging with said conical surface of said ring, and further damping means within said housing and surrounding said socket.

8. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and a spring ring removably secured to the upper end of said socket, the outer edge of said spring ring engaging with the wall of said housing and forming said upper tilting edge, and further damping means within said housing and surrounding said socket.

9. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and a ring loosely fitting between the walls of said housing and said socket and forming said upper tilting edge, and further damping means within said housing and surrounding said socket.

10. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and a resilient ring of an elastic synthetic material on the upper end of said socket, the outer edge of said ring engaging with the wall of said housing and forming said upper tilting edge, and further damping means within said housing and surrounding said socket.

11. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, an insert rigidly mounted in said housing and having a level upper surface portion engaging with and supporting the bottom end of said socket to permit said socket to tilt thereon about said lower tilting edge, and a spring acting upon said socket to press at least a part of said bottom end upon said portion, and further damping means within said housing and surrounding said socket.

12. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and further damping means within said housing and surrounding said socket and comprising an oil-filled damping coil.

13. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and further damping means within said housing and surrounding said socket and comprising a plurality of tubes telescoped into each other, and oil substantially filling out the gaps between said tubes.

14. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and further damping means within said housing and surrounding said socket, said further damping means comprising a layer of synthetic material having cavities, and oil substantially filling out said cavities.

15. A foot bearing structure for a spindle of a spinning or twisting machine comprising a common housing, a foot bearing for said spindle mounted within said housing, a damping and centering socket within said housing surrounding said foot bearing with a small intermediate clearance, means for permitting said socket to tilt relative to said housing comprising upper and lower tilting edges serving as centering means at the upper and bottom ends, respectively, of said socket, and further damping means within said housing and surrounding said socket, the height of said socket being substantially two to four times greater than the inner diameter of said housing near said upper tilting edge.

16. A foot bearing structure for a spindle of a spinning or twisting machine as defined in claim 3, wherein said further damping means comprises a layer of synthetic material having cavities therein and oil substantially filling out said cavities.

17. A foot bearing structure for a spindle of a spinning or twisting machine as defined in claim 5, wherein said further damping means comprises a plurality of tubes telescoped within each other and oil substantially filling out the gaps between said tubes.

18. A foot bearing structure for a spindle of a spinning or twisting machine as defined in claim 3, wherein said insert has at least one aperture extending therethrough and arranged between said conical lower surface portion and said level upper surface portion whereby foreign matter accumulating in the bottom of said bearing structure may pass therethrough.

References Cited in the file of this patent

UNITED STATES PATENTS

| | | |
|---|---|---|
| 509,982 | Wattles | Dec. 5, 1893 |
| 2,583,080 | Beerli | Jan. 22, 1952 |
| 2,704,946 | Gray et al. | Mar. 29, 1955 |
| 2,969,262 | Staufert | Jan. 24, 1961 |
| 2,981,051 | Maurer | Apr. 25, 1961 |
| 3,012,395 | Stahel | Dec. 12, 1961 |

FOREIGN PATENTS

| | | |
|---|---|---|
| 918,738 | Germany | Oct. 4, 1954 |